United States Patent [19]

Petersen et al.

[11] 4,064,008

[45] Dec. 20, 1977

[54] GELATIN EXTRACTION

[75] Inventors: Bent Riber Petersen, Copenhagen, Denmark; John Russel Yates, Hughes, Australia

[73] Assignee: Novo Industri A/S, Bagsvaerd, Denmark

[21] Appl. No.: 701,888

[22] Filed: July 1, 1976

[30] Foreign Application Priority Data

July 11, 1975 United Kingdom ............... 29341/75

[51] Int. Cl.² ................................................ C12B 1/00
[52] U.S. Cl. ............................................ 195/6; 195/4
[58] Field of Search ........................................ 195/2–6; 260/118

[56] References Cited

U.S. PATENT DOCUMENTS 2,184,494  12/1939  Glass et al. ............................ 260/118
2,908,615  10/1959  Keil ......................................... 195/6

*Primary Examiner*—Lionel M. Shapiro
*Attorney, Agent, or Firm*—Fidelman, Wolffe & Waldron

[57] ABSTRACT

In the treatment of collagen containing materials for gelatin extraction purposes, conditioning the collagen source enzymatically at pH 7–13 with protease, pH level being selected to match the pH optimum of the protease, for 4–72 hours, at 20° – 40° C.

12 Claims, No Drawings

GELATIN EXTRACTION

This invention relates to improvement in the conditioning of collagen for gelatin extraction.

Collagen is a major protein constituent of connective tissue in the vertebrate as well as invertebrate animal kingdoms. In practice, meat industry materials rich in collagen such as bone, and skin (notably pork skin) are the starting materials for the production of collagen or collagen derived products like gelatin.

Gelatin is found in two types: type A gelatin prepared by acid pretreatment of a collagenous raw material, preferably porkskin, and type B gelatin prepared by alkaline pretreatment of a collagenous raw material, preferably dry bone or dehaired hides.

This invention relates to the alkaline (and neutral) conditioning of collagen for gelatin extraction, the produced gelatin thus being of type B.

For detailed description of the alkaline treatment conversion of collagen sources into gelatin, reference is made to Kirk Othmer, Encyclopedia of Chemical Technology Vol. 7 (1951) page 145-157. In any event, the usual alkaline conditioning of collagen for production of type B gelatin involves treating the collagen material, such as ossein, dry or wet limed hides, etc. with from 5-15% lime for extended periods of time to break down the collagen to gelatin and other proteinaceous materials.

Unfortunately, the lime treatment is a very time consuming step, which lasts 3 week as a minimum and can extend to 12 weeks. If the conditioning time could be reduced, the production capacity of a gelatin plant of a given size could be raised substantially.

We have now found that it is possible to reduce the conditioning time and to raise the production capacity of a given gelatin producing plant accordingly, if conditioning of the collagen for gelatin extraction is carried out enzymatically under the conditions herein described.

More specifically the alkaline or neutral conditioning of collagen for gelatin extraction comprises treatment of a suitable collagenous raw material, preferably ossein, dehaired hides, or dry - or wet-limed, or salted hides, with a solution of a proteolytic enzyme at a temperature between 20° and 40° C in between 4 and 72 hour and at a pH between 7 and 13, whereafter the proteolytic enzymatic activity is eliminated.

Thus the capacity of a collagen conditioning plant might be raised a factor of about 7-500 if collagen conditioning is performed according to practice of this invention.

A preferred embodiment of collagen conditioning according to the invention comprises use of trypsin as the proteolytic enzyme.

Another preferred embodiment of collagen conditioning according to the invention comprises use of proteinases produced microbially from microorganisms of the genue Bacillus as the proteolytic enzyme, and notably from *B. subtillus* and from *B. licheniformis*.

Another preferred embodiment of collagen conditioning according to the invention comprises use of alkaline resistant proteinases produced according to practice of British Pat. No. 1,243,784 (which corresponds to U.S. Pat. No. 3,723,250). The hides employed for production of gelatin may have already been limed, as for example for dehairing purposes, and are at a rather alkaline pH value. Since the alkaline resistant proteinases are active at the pH values of the liming conditions employed for dehairing (see U.S. Pat. No. 3,840,433), these enzymes offer the special advantage that the pH of the float for such hides need not be adjusted.

Another preferred embodiment of collagen conditioning according to the invention comprises use of an enzyme concentration in the conditioning float of between 0.05 and 5 Anson units/l, preferably between 0.5 and 1.5 Anson unit/l.

Another preferred embodiment of collagen conditioning according to the invention comprises use of a float ratio (the weight ratio between the float and the collgenous material) between 0.5 and 10.

Another preferred embodiment of collagen conditioning according to the invention comprises a conditioning time between 6 and 24 hours.

Another preferred embodiment of collagen conditioning according to the invention comprises the use of the proteolytic enzymes in an amount corresponding to a concentration between $10^{-4}$ and $5 \times 10^{-2}$ Anson units/g collagenous material.

Another preferred embodiment of collagen conditioning according to the invention comprises a conditioning temperature between 25° and 35° C.

Another preferred embodiment of collagen conditioning according to the invention comprises that the pH of the float is adjusted to pH value equal to or substantially equal to the pH optimum of the proteolytic enzyme.

In another preferred embodiment of collagen conditioning according to the invention the elimination of the proteolytic enzyme is performed by inactivation of the enzyme activity by means of a pH adjustment to a value in the strongly acid range.

The proteolytic activity is determined by means of the Anson haemoglobin method, as described in J. Gen. Physiol. 22, 79 (1939).

The invention will be illustrated by the following specific examples of practice thereof (on a laboratory scale).

As raw material were used test pieces of salted cow hide each weighing 200 g and cut in squares with edges of 1-2 cm. The gelatin was prepared in the following manner.

Each charge of 200 g cow hide were washed in a Launder-0-meter with 300% tap water of room temperature for 30 minutes, this and the following percentages referring to the original weight of the salted cow hides, viz. 200 g. The wash water was discarded, and each charge was rinsed manually with further 300% tap water.

A treatment float series was prepared. In the table below: The selected enzyme is shown in column 1; the enzyme activity is shown in column 2; and the enzyme concentration in the float is shown in column 3. Each charge of 200 g cow hide was treated with 200% of the enzyme float at the temperature shown in column 4 in the table, the treatment time appearing in column 5 in the table. The pH of the floats appear in column 6 in the table (when the ph value is adjusted, this was performed with NaOH). As preservative 0.8 g of sodium-o-phenylphenol was added. The enzymatic float was decanted after the end of the conditioning time, and the cow hides were rinsed with 300% tap water, and thereupon 2 × 15 minutes in the Launder-0-meter with 2 × 300% ion exchanged water. In the last 300% rinsing float the pH thereof is adjusted to between 2 and 3 by addition of sulfuric acid, and the pH is maintained at this value for half an hour in order to inactivate the enzyme, which might otherwise degrade the gelatin extracted at a later stage. This low pH float is discarded.

Now the conditioned cow hides are ready for gelatin extraction. The gelatin extraction was treatment for 3 hours with 150% ion exchanged water at an initial pH of 7.0 and 70° C in the Launder-0-meter. The extract is filtered on a membrane filter, and the clear filtrate is desodorized with 0.6 g active carbon and filtered again. The filtrate is evaporated at 30° C and the residue, which is the gelatin, is weighted (column 7 in the table).

TABLE

| Example no. | 1 Enzyme | 2 Enzyme activity Anson units/g | 3 Enzyme conc. in float, g/l | 4 Conditioning temperature, ° C | 5 Conditioning time, hours | 6 pH of conditioning liquid | 7 Yield of gelatin,g |
|---|---|---|---|---|---|---|---|
| 1 | BPN | 1.5 | 1 | 40 | 17 | 7.2 (natural) | 20.5 |
| 2 | ALCALASE | 1.5 | 1 | 40 | 17 | 9 | 7.0 |
| 3 | ESPERASE | 4.0 | 1.5 | 40 | 17 | 9 | 25.4 |
| 4 | TRYPSIN | 3.0 | 0.5 | 40 | 17 | 8 | 2.75 |
| 5 | BPN | 1.5 | 1 | 25 | 17 | 7.2 (natural) | 7.25 |
| 6 | ALCALASE | 1.5 | 1 | 25 | 17 | 9 | 40.8 |
| 7 | ESPERASE | 4.0 | 1.5 | 25 | 17 | 9 | 46.6 |
| 8 | TRYPSIN | 3.0 | 0.5 | 25 | 17 | 8 | 5.63 |
| 9 | No enzyme | 0 | 0 | 25 | 17 | 8 | 1.5 |
| 10 | BPN | 1.5 | 1 | 25 | 6 | 7.4 (natural) | 12.1 |
| 11 | ALCALASE | 1.5 | 1 | 25 | 6 | 9 | 20.9 |
| 12 | ESPERASE | 4.0 | 1.5 | 25 | 6 | 9 | 18.0 |

BPN (Bacterial proteinase NOVO) is a proteolytic enzyme produced from *B. subtillus*
ALCALASE is a proteolytic enzyme produced from *B. licheniformis*
ESPERASE is an alkaline protease produced according to British patent 1,243,784

What is claimed is:

1. A process for conditioning of collagen for gelatin extraction, which comprises treating a suitable collagenous raw material with a solution of proteolytic enzyme at a temperature between 20° and 40° C, in concentration in the treatment solution of between 0.05 and 5 Anson units/l, for between 4 and 72 hours and at a pH between 7 and 13, whereafter the proteolytic enzymatic activity is eliminated.

2. A process according to claim 1, wherein the proteolytic enzyme is trypsin.

3. A process according to claim 1, wherein the proteolytic enzyme is a proteinase produced microbially from microorganisms of the genus Bacillus.

4. A process according to claim 1, wherein the enzyme is a proteinase produced microbially from Bacillus licheniformis.

5. A process according to claim 1, wherein the proteolytic enzyme is used in concentration in the treatment solution between 0.5 and 1.5 Anson units/l.

6. A process according to claim 5, wherein the weight ratio between the treatment solution and the collagenous material is between 0.5 and 10.

7. A process according to claim 1, wherein the conditioning time is between 6 and 24 hours.

8. A process according to claim 1, wherein the proteolytic enzyme is used in an amount corresponding to a concentration between $10^{-4}$ and $5 \times 10^{-2}$ Anson units/g collagenous material.

9. A process according to claim 1, wherein the conditioning temperature is between 25° and 35° C.

10. A process according to claim 1, wherein the proteolytic enzyme is an alkaline resistant proteinase and the pH value of the treatment solution is not adjusted.

11. A process according to claim 1, wherein the pH of the float is adjusted to the pH optimum of the proteolytic enzyme.

12. A process according to claim 1, wherein the elimination of the proteolytic enzyme is performed by a pH adjustment to a value in the strongly acid range.

* * * * *